No. 12,475. REISSUED APR. 24, 1906.
F. D. JACOBS.
ROOFING AND SIDING MATERIAL.
APPLICATION FILED MAR. 26, 1906.
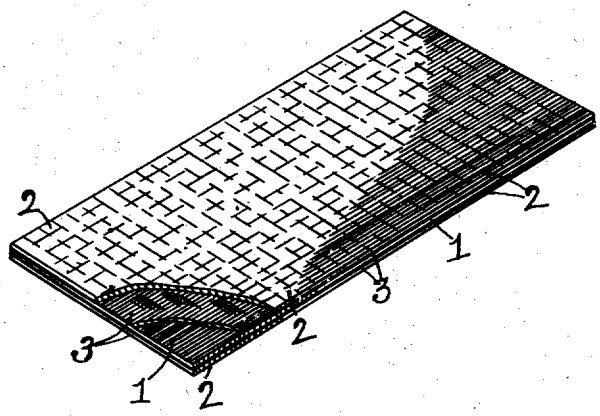
Witnesses.
C. H. Tannett
J. Murphy.
Inventor.
Frank Davis Jacobs
by Jas. H. Churchill
atty.

UNITED STATES PATENT OFFICE.

FRANK DAVIS JACOBS, OF NORTHAMPTON, MASSACHUSETTS, ASSIGNOR TO PROTECTED METAL COMPANY, OF SPRINGFIELD, MASSACHUSETTS, A CORPORATION OF MASSACHUSETTS.

ROOFING AND SIDING MATERIAL.

No. 12,475. Specification of Reissued Letters Patent. Reissued April 24, 1906.

Original No. 788,358, dated April 25, 1905. Application for reissue filed March 26, 1906. Serial No. 308,192.

*To all whom it may concern:*

Be it known that I, FRANK DAVIS JACOBS, a citizen of the United States, residing at Northampton, in the county of Hampshire and State of Massachusetts, have invented an Improvement in Roofing and Siding Material, of which the following description, in connection with the accompanying drawing, is a specification, like figures of the drawing referring to like parts.

My invention relates to roofing and siding material for building purposes, and has for its object to provide an improved material embodying all the advantages of metal roofing and siding material and none of its disadvantages, as will be hereinafter more definitely pointed out and claimed, reference being had to the accompanying drawing, in which the figure is a perspective view of a sheet of my improved material, the same being partly broken away at one corner.

As the base or body portion of the material I employ a continuous sheet of metal, preferably annealed steel, (denoted in the drawing by the reference-numeral 1,) and upon each side of the same I apply a coating of fibrous fireproof material 2—such as asbestos, mineral wool, or the like—preferably in the form of a sheet and firmly united to said metal base by a suitable weather-resisting composition 3, consisting, preferably, of india-rubber solution and petroleum-asphalt, the same being preferably composed of one ounce of the rubber solution to one gallon of the asphalt. In practice the uniting composition 3 is heated until it becomes thin. The metal plate 1 is then dipped therein, and finally there is applied to said plate on each side a sheet 2 of the asbestos, mineral wool, or the like under heavy pressure, the parts becoming thereby firmly united to each other, with the exterior surfaces of the sheets 2 in their normal or fireproofing condition. The material thus formed embodies all the advantages of a metallic roofing or siding plate, and at the same time the metal plate is thoroughly protected from the elements, whereby rusting is prevented.

By employing a continuous sheet of metal as the base as distinguished from a woven metal fabric I obtain all the advantages of the latter in the way of flexibility and at the same time obviate the disadvantage possessed by woven-wire fabrics of permitting a movement of the wires composing the same with respect to each other that not only will permit the article to be distorted, but also will tend to loosen and break down the filling and uniting compound.

The asphalt binder intermediate the metal sheet and the layers or sheets of asbestos or mineral wool constitutes an effective means for securing the asbestos layers to the metal sheet, and the elastic nature of said binder permits the finished product to be bent without danger of cracking the binder. Furthermore, the asphalt binder is waterproof, and while it is more or less inflammable it is safeguarded against fire, by reason of the fact that the asbestos sheets of the finished product retain their exterior surfaces in their original fireproofing condition.

Having thus described my invention, what I claim as new, and desire to secure by Letters Patent, is—

1. A roofing and siding material, embodying a base or body portion consisting of a continuous sheet of metal, and having on each side a protective layer of fibrous fireproof material, *e. g.* asbestos or mineral wool, affixed to said sheet by an asphalt cement, with their exterior surfaces in their normal or fireproofing condition.

2. A roofing and siding material, comprising a base or body portion consisting of a sheet of annealed steel, a protective layer of asbestos sheeting on each side of said base, and intermediate layers of uniting composition consisting of an admixture of rubber solution and asphalt.

FRANK DAVIS JACOBS.

Witnesses:
JAS. H. CHURCHILL,
J. MURPHY.